US012784971B2

(12) United States Patent
Yamashita et al.

(10) Patent No.: US 12,784,971 B2
(45) Date of Patent: Nov. 3, 2026

(54) POWER TRANSMISSION COIL UNIT

(71) Applicant: TOYOTA JIDOSHA KABUSHIKI KAISHA, Toyota (JP)

(72) Inventors: Osamu Yamashita, Toyota (JP); Naoki Iwata, Kasugai (JP); Shinjiro Saigusa, Toyota (JP); Sungmin Cho, Susono (JP); Katsuya Kobayashi, Okazaki (JP); Toshiya Hashimoto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 634 days.

(21) Appl. No.: 18/239,498

(22) Filed: Aug. 29, 2023

(65) Prior Publication Data

US 2024/0096549 A1 Mar. 21, 2024

(30) Foreign Application Priority Data

Sep. 15, 2022 (JP) ................................ 2022-147079

(51) Int. Cl.
*H01F 38/14* (2006.01)
*H01F 17/04* (2006.01)
*H01F 27/28* (2006.01)

(52) U.S. Cl.
CPC ............. *H01F 38/14* (2013.01); *H01F 17/04* (2013.01); *H01F 27/2804* (2013.01)

(58) Field of Classification Search
CPC ...... H01F 38/14; H01F 17/04; H01F 27/2804; H01F 27/361; H01F 27/363; H01F 27/366; H01F 27/40; H02J 50/005; H02J 50/12; H02J 50/70
USPC ........................................ 336/200, 232, 192
See application file for complete search history.

(56) References Cited

U.S. PATENT DOCUMENTS

2012/0223794 A1* 9/2012 Asakura .................. H01F 27/06 336/65
2013/0181667 A1* 7/2013 Takeshita ................ B60L 53/12 320/108
2015/0340153 A1* 11/2015 Lohr ....................... H01F 38/14 336/200
2017/0036552 A1* 2/2017 Yuasa ................... B60L 53/122
2017/0040840 A1* 2/2017 Yuasa ..................... H01F 27/38

FOREIGN PATENT DOCUMENTS

WO 2012/039077 A1 3/2012

* cited by examiner

*Primary Examiner* — Shawki S Ismail
*Assistant Examiner* — Kazi S Hossain
(74) *Attorney, Agent, or Firm* — Dinsmore & Shohl LLP

(57) ABSTRACT

A power transmission coil unit provided with a board having at its back surface a component mounting part to which electronic components are mounted and a coil forming part at which a coil comprised of a conductor pattern is formed, a core arranged so as to abut against a back surface of the board and formed with a hole for housing the electronic components at a position facing the electronic components, and a protective member provided at a further front surface side of the power transmission coil unit than the component mounting part of the board and receiving a load applied to the power transmission coil unit. A space is formed on a back surface side of the facing portion of the protective member positioned at the location facing the component mounting part.

3 Claims, 3 Drawing Sheets

POWER TRANSMISSION COIL UNIT

CROSS-REFERENCE TO RELATED APPLICATION

This application claims priority to Japanese Patent Application No. 2022-147079 filed on Sep. 15, 2022, the entire contents of which are herein incorporated by reference.

FIELD

The present disclosure relates to a power transmission coil unit.

BACKGROUND

WO2012/039077 discloses a conventional power transmission coil unit (power transmission device) for noncontact power supply configured having a power transmission coil and capacitors and other electronic components covered by a housing and using that housing to protect the power transmission coil and electronic components from load applied from above.

SUMMARY

It has been thought to configure a power transmission coil unit as a portable thin flat shaped power supply mat and place it at for example an event site, evacuation site, or other location where usually noncontact power supply is not possible so as to supply power by noncontact at that location. However, in the above-mentioned conventional power transmission coil unit, a housing is required for protecting the power transmission coil and electronic components, so there were the problems that the power transmission coil unit was difficult to reduce in size and lighten in weight and therefore the power transmission coil unit was difficult to transport and set up.

The present disclosure was made focusing on such problems and has as its object to enable a power transmission coil unit to be reduced in size and lightened in weight.

To solve the problems, according to one aspect of the present disclosure, there is provided a power transmission coil unit for transmitting electric power to something for receiving power by noncontact comprising a board configured to have a component mounting part on its back surface at which electronic components are mounted and a coil forming part at which is formed a coil comprised of a conductor pattern, a core arranged so as to abut against the back surface of the board and formed with a hole for holding the electronic components at a position facing the electronic components, and a protective member configured to form a front surface of the power transmission coil unit and receiving a load applied to the power transmission coil unit. A space is formed on a back surface side of the facing portion of the protective member positioned at the location facing the component mounting part.

According to this aspect of the present disclosure, since the back surface side of the facing part of the protective member positioned at a location facing the component mounting part is formed by an empty space, when a load is applied to the power transmission coil unit, the load can be received by the facing portion while the facing portion is kept from ending up directly pressing against the component mounting part of the board. Therefore, the load applied to the power transmission coil unit can be kept from directly acting on the component mounting part of the board and the board can be kept from bending, so the electronic components mounted on the back surface of the board can be protected. Therefore, there is no need to cover the power transmission coil unit by a housing, and the power transmission coil unit can be reduced in size or lightened in weight.

DESCRIPTION OF EMBODIMENTS

Figure 1:
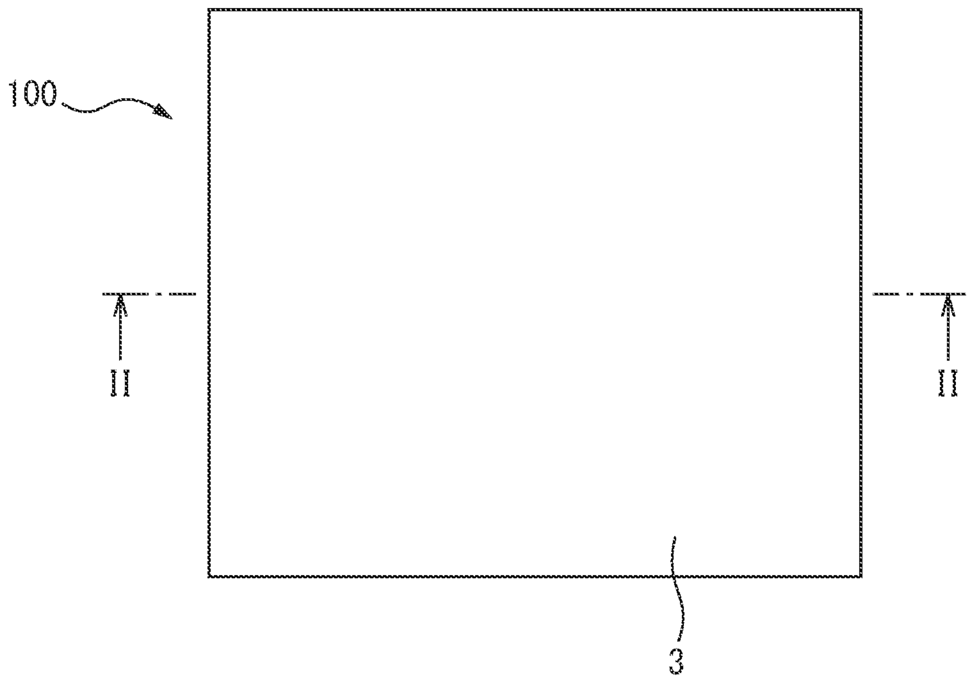
FIG. 1 is a schematic plan view of a power transmission coil unit according to a first embodiment of the present disclosure.

Below, referring to the drawings, embodiments will be explained in detail. Note that in the following explanation, similar component elements will be assigned the same reference notations.

Figure 2:
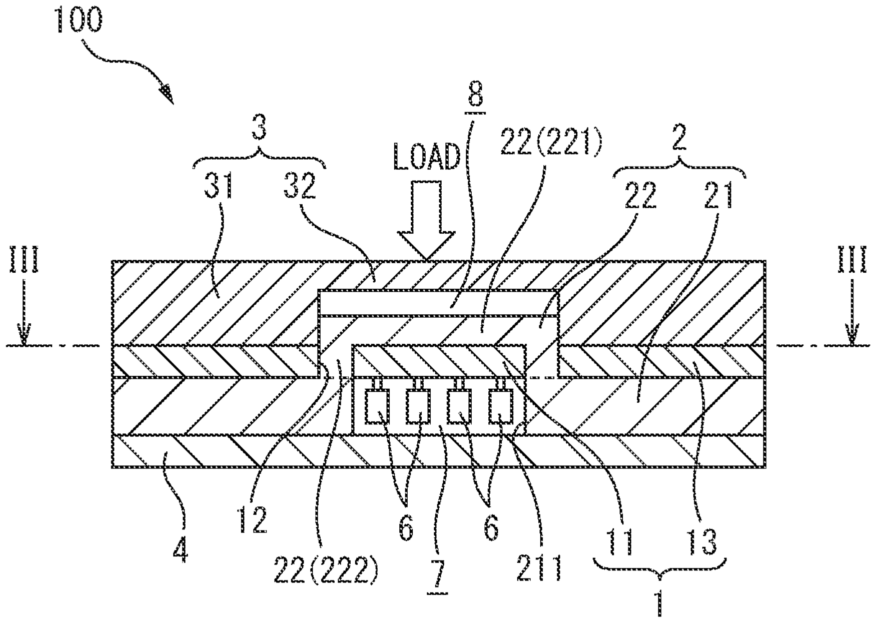
FIG. 2 is a schematic cross-sectional view of the power transmission coil unit along a line II-II of FIG. 1.
Figure 3:
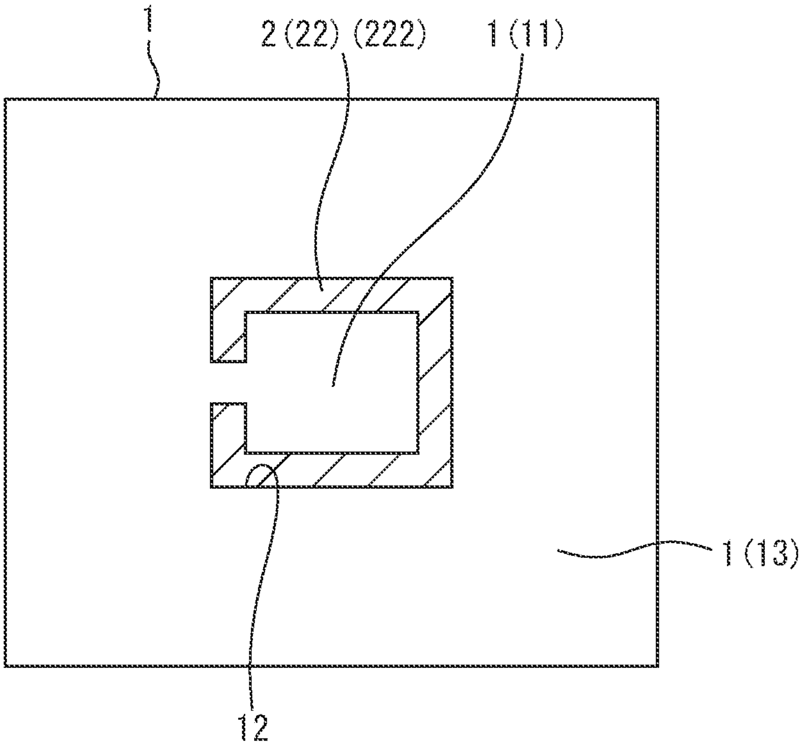
FIG. 3 is a schematic cross-sectional view of the power transmission coil unit along a line III-III of FIG. 2.

FIG. 1 is a schematic plan view of a power transmission coil unit 100 according to a first embodiment of the present disclosure. FIG. 2 is a schematic cross-sectional view of the power transmission coil unit 100 along a line II-II of FIG. 1. FIG. 3 is a schematic cross-sectional view of the power transmission coil unit 100 along a line III-III of FIG. 2.

A power transmission coil unit 100 is configured to be able to transmit electric power supplied from an external AC power supply or other power supply to something for receiving power by a noncontact. The thing for receiving power is not particularly limited in type and may be a vehicle or drone or other moving object or may be a communication device, home electrical appliance, etc. The power transmission coil unit 100 is portable and is configured to be able to be set at for example an event site or evacuation site or other location where usually noncontact power supply is not possible and to supply power by noncontact to something for receiving power used at those places. At that time, a plurality of power transmission coil units 100 can be electrically coupled with each other to enable the range of power supply to be freely enlarged.

Below, referring to FIG. 1 to FIG. 3, details of the component parts of the power transmission coil unit 100 according to the present embodiment will be explained. The power transmission coil unit 100 according to the present embodiment is provided with a printed coil board 1, core 2, spacer 3, and bottom plate 4 and is thin and flat in shape so as to enable a vehicle to easily ride up over it.

The printed coil board 1 is for example a hard printed circuit board on the front surface etc. of which a power transmission coil comprised of a conductor pattern (not shown) is formed. At the back surface side of the center part of the printed coil board 1, for example capacitors 6 and other electronic components are mounted by soldering etc.

As shown in FIG. 3, at the printed coil board 1, if referring to the region at the center part of the back surface side where the capacitors 6 and other electronic components are mounted as the "component mounting part 11", the printed coil board 1 is formed with a core engaging hole 12 of a C-shaped groove for receiving (or passing) a projecting part 222 of a top core 22 of a later explained core 2 so as to surround the vicinity of the component mounting part 11. Further, the region 13 (below, referred to as the "coil forming part") at the outside from the core engaging hole 12 is formed so that the circular or rectangular power transmission coil comprised of the conductor pattern surrounds the vicinity of the core engaging hole 12.

The power transmission coil formed at the printed coil board 1 forms a resonance circuit together with the capacitors 6 mounted at the printed coil board 1 and transmits power by noncontact to the thing for receiving power arranged on the power transmission coil unit 100 through magnetic resonance coupling (magnetic resonance).

The core 2 is provided with a bottom core 21 and top core 22 configured by ferrite or other magnetic materials.

The bottom core 21 is a flat plate shaped member formed with a hole 211 at its center part and is arranged at a back surface side of the printed coil board 1. The hole 211 of the bottom core 21 functions as a component holding space 7 at which the capacitors 6 and other electronic components mounted on the printed coil board 1 are held when arranging the printed coil board 1 on the front surface of the bottom core 21 and arranging the bottom plate 4 on the back surface of the bottom core 21. That is, the component holding space 7 is a space defined by the back surface of the printed coil board 1, the inner circumferential surface of the hole 211 of the bottom core 21, and the front surface of the bottom plate 4 when arranging the printed coil board 1 at the front surface of the bottom core 21 and arranging the bottom plate 4 at the back surface of the bottom core 21. In the present embodiment, the bottom core 21 is bonded to the back surface of the printed coil board 1.

The top core 22 is provided with a flat plate shaped peak part 221 covering the front surface of the component mounting part 11 of the printed coil board 1 and a projecting part 222 projecting out from the peak part 221 downward and engaged with the core engaging hole 12 of the printed coil board 1. In the present embodiment, the back surface of the peak part 221 of the top core 22 abuts against the component mounting part 11 of the printed coil board 1.

The bottom plate 4 is a flat plate shaped member comprised of a metal material (for example, aluminum or copper) functioning as an electromagnetic shield and is arranged over the entire back surface side of the bottom core 21. The bottom plate 4 keeps magnetic flux from leaking to the outside from the back surface side of the power transmission coil unit 100. In the present embodiment, the bottom plate 4 is bonded to the back surface of the bottom core 21.

The spacer 3 is a plastic member arranged at the front surface of the printed coil board 1 and forming the front surface of the power transmission coil unit 100 so as to make the front surface of the power transmission coil unit 100 flat, that is, eliminate any step difference occurring between the printed coil board 1 and top core 22.

Here, as shown in FIG. 2, the power transmission coil unit 100 according to the present embodiment is a multilayer member comprised of the bottom plate 4, core 2, printed coil board 1, and spacer 3 stacked together and is not provided with a housing holding inside it and protecting the multilayer member. For this reason, by just the amount of elimination of the housing, the power transmission coil unit 100 can be reduced in size and lightened in weight and made easier to transport, set up, etc. However, on the other hand, at the time of supplying power, the load of the vehicle riding up over the power transmission coil unit 100 or other thing for receiving power directly acts on the power transmission coil unit 100. If, at this time, the load of the thing for receiving power causes the printed coil board 1 to bend and the component holding space 7 to end up being compressed, the capacitors 6 and other electronic components held inside it are liable to be crushed and otherwise break.

Therefore, in the present embodiment, the spacer 3 is used to protect the capacitors 6 and other electronic components held in the component holding space 7 from the load of the vehicle riding up over the power transmission coil unit 100 or other thing for receiving power. Specifically, the spacer 3 according to the present embodiment is provided with a thick wall part 31 and a thin wall part 32.

The thick wall part 31 is a part arranged at the coil forming part 13 and bonded to its front surface and has a thickness whereby the position of the front surface becomes higher than the front surface of the peak part 221 of the top core 22.

The thin wall part 32 is a part positioned at a location facing the component mounting part 11 of the printed coil board 1 when arranging the thick wall part 31 at the coil forming part 13 and is thinner in thickness than the thick wall part 31. The height of the front surface of the thin wall part 32 is made the same as the height of the front surface of the thick wall part 31. The thin wall part 32 does not abut against anything at all at its back surface due to the difference in thickness from the thick wall part 31. The back surface side of the thin wall part 32 is formed by an empty space 8 defined by the back surface of the thin wall part 32, the inner circumferential surface of the thick wall part 31, and the front surface of the peak part of the top core.

By bonding the thick wall part 31 to the coil forming part 13 in this way, that is, by bonding the spacer 3 and printed coil board 1 to form an integral member, it is possible to raise the rigidities of the two and making bending more difficult than when not bonding them together. Therefore, when a load is applied to the power transmission coil unit 100, it is possible to keep the printed coil board 1 from bending and the component holding space 7 from ending up being compressed due to that load. Therefore, the component holding space 7 can be kept from being compressed and the capacitors 6 inside from being crushed and otherwise ending up breaking.

Further, the back surface of the thin wall part 32 facing the component mounting part 11 of the printed coil board 1 does not abut against anything and its back surface side is formed by an empty space 8, so when a load is applied to the power transmission coil unit 100, it is possible to keep the component mounting part 11 of the printed coil board 1 from being directly pressed against by the function of the thin wall part 32, so it is possible to keep the printed coil board 1 from bending. Therefore, the component holding space 7 can be kept from being compressed and the capacitors 6 inside from being crushed and otherwise ending up breaking.

In this way, by just making the back surface of the thin wall part 32 facing the component mounting part 11 of the printed coil board 1 not abut against anything and making the back surface side an empty space 8 or by just making the thick wall part 31 bond with the coil forming part 13, it is possible to obtain the effect of keeping the printed coil board 1 from bending and keeping the electronic components held in the component holding space 7 from ending up breaking, but by combining these like in the present embodiment, it is possible to keep the printed coil board 1 from bending even more.

The power transmission coil unit 100 according to the present embodiment explained above is provided with the printed coil board 1 (board) configure to have the component mounting part 11 at the back surface of which electronic components are mounted and the coil forming part 13 at which the coil comprised of a conductor pattern is formed, the core 2 arranged so as to contact the back surface of the printed coil board 1 and formed with the hole 211 for housing the electronic components at a position facing the electronic component, and the spacer 3 (protective member) configured to form the front surface of the power transmission coil unit 100 and receive the load applied to the power transmission coil unit 100.

Further, the empty space 8 (space) is formed on a back surface side of the thin wall part 32 (facing portion) of the spacer 3 positioned at the location facing the component mounting part 11, so when a load is applied to the power transmission coil unit 100, the component mounting part 11 of the printed coil board 1 can be kept from being directly pressed against by the function of the thin wall part 32. For this reason, the load applied to the power transmission coil unit 100 directly acts on the component mounting part 11 of the printed coil board 1 to keep the printed coil board 1 from bending, so it is possible to keep the electronic components mounted at the back surface of the printed coil board 1 from being crushed and otherwise ending up breaking due to bending of the printed coil board 1.

In this way, according to the power transmission coil unit 100 according to the present embodiment, it is possible to protect the electronic components mounted at the printed coil board 1 even without a housing, so the power transmission coil unit 100 can be reduced in size and lightened in weight.

The spacer 3 according to the present embodiment is provided with a thick wall part 31 arranged at the coil forming part 13 and bonded with its front surface and a thin wall part 32. The thin wall part 32 does not abut against anything at all at its back surface due to the difference in wall thickness from the thick wall part 31. The empty space 8 is formed on a back surface side of the thin wall part 32.

By making the thick wall part 31 bond with the coil forming part 13 in this way, the spacer 3 and the printed coil board 1 can be made an integral member and the rigidities of the two can be raised, so when a load is applied to the power transmission coil unit 100, the printed coil board 1 can be kept from bending even more. For this reason, the load resistance of the power transmission coil unit 100 can be made higher.

Second Embodiment

Next, a second embodiment of the present disclosure will be explained. The present embodiment differs in the configuration of the power transmission coil unit 100 from the first embodiment on the point of the core 2 receiving the load. Below, mainly the points of difference will be explained.

Figure 4:
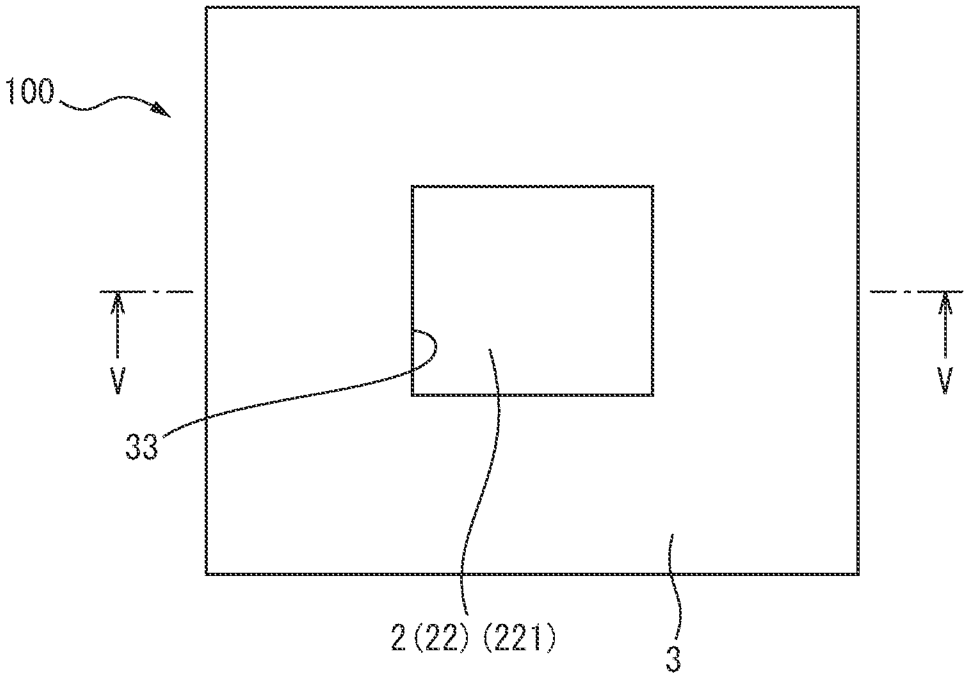
FIG. 4 is a schematic plan view of a power transmission coil unit according to a second embodiment of the present disclosure.
Figure 5:
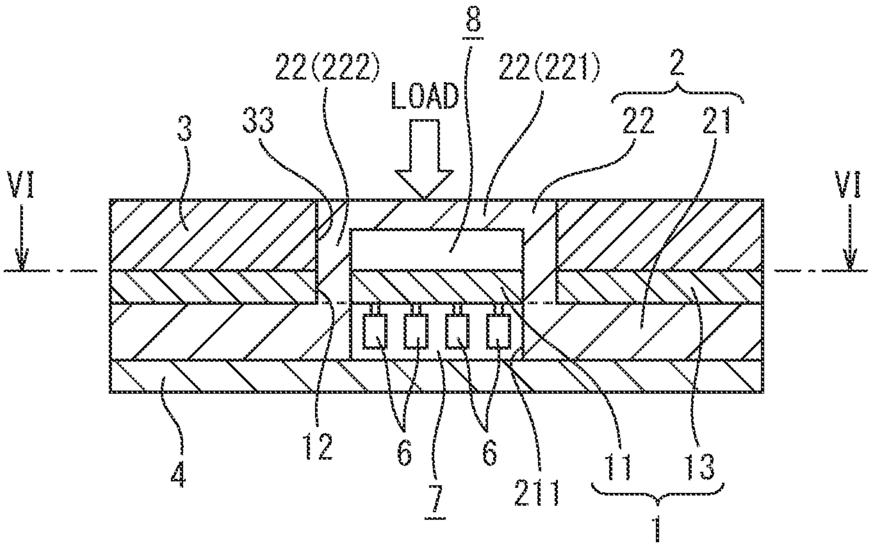
FIG. 5 is a schematic cross-sectional view of the power transmission coil unit along a line V-V of FIG. 4.
Figure 6:
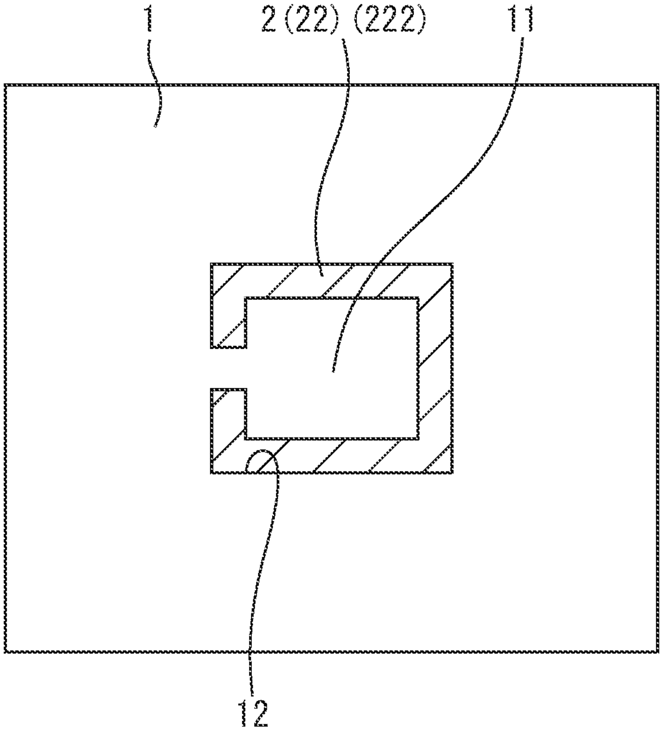
FIG. 6 is a schematic cross-sectional view of the power transmission coil unit along a line VI-VI of FIG. 5.

FIG. 4 is a schematic plan view of a power transmission coil unit 100 according to a second embodiment of the present disclosure. FIG. 5 is a schematic cross-sectional view of the power transmission coil unit 100 along a line V-V of FIG. 4. FIG. 6 is a schematic cross-sectional view of the power transmission coil unit 100 along a line VI-VI of FIG. 5.

As shown in FIG. 4 and FIG. 5, the spacer 3 according to the present embodiment is a flat plate shaped member at the center part of which a spacer use core engaging hole 33 is formed for engaging with the peak part 221 of the top core 22 and is arranged at the front surface of the coil forming part 13. The thickness of the spacer 3 is adjusted so that the height of the front surface of the spacer 3 matches the front surface of the peak part 221 of the top core 22.

Further, in the present embodiment, the length (height) of the projecting part 222 of the top core 22 is adjusted so that the back surface of the peak part 221 does not abut against the front surface of the component mounting part 11 of the printed coil board 1 whereby an empty space 8 is formed at the back surface side of the peak part 221 by the back surface of the peak part 221, the inner circumferential surface of the projecting part 222, and the front surface of the component mounting part 11 of the printed coil board 1. Due to this, when a load is applied to the power transmission coil unit 100, the load can be received by the top core 22 while the component mounting part 11 of the printed coil board 1 can be kept from being directly pressed against by the peak part 221 of the top core 22. In this way, not the spacer 3, but the core 2 is made to function as the protective member receiving the load applied to the power transmission coil unit 100.

The printed coil board 1 (board) of the power transmission coil unit 100 according to the present embodiment explained above has a groove shaped core engaging hole 12 formed in the vicinity of the component mounting part 11 so as to surround the component mounting part 11. The core 2 is provided with a top core 22 serving as the protective member and a bottom core 21 arranged so as to abut against the back surface of the printed coil board 1 and having the hole 211.

Further, the top core 22 is provided with a peak part 221 serving as the facing portion facing the component mounting part 11 and a projecting part 222 extending from the peak part 221 to the bottom core 21 and engaging with (or passed through) the core engaging hole 12. The back surface of the peak part 221 does not abut against anything. The empty space 8 is formed on a back surface side of the peak part 221. For this reason, when a load is applied to the power transmission coil unit 100, the load can be received by the top core 22 while the component mounting part 11 of the printed coil board 1 can be kept from being directly pressed against by the peak part 221 of the top core 22.

Therefore, the load applied to the power transmission coil unit 100 can be kept from directly acting on the component mounting part 11 of the printed coil board 1 and bending the printed coil board 1, so it is possible to keep electronic components mounted at the back surface of the printed coil board 1 from being crushed or otherwise ending up being damaged due to bending of the printed coil board 1.

Above, embodiments of the present disclosure were explained, but the embodiments only show some of the examples of application of the present disclosure and are not intended to limit the technical scope of the present disclosure to the specific constitutions of the embodiments.

The invention claimed is:

1. A power transmission coil unit configured to transmit electric power to something for receiving power by noncontact, comprising:

- a board configured to have a component mounting part on its back surface at which electronic components are mounted and a coil forming part at which is formed a coil comprised of a conductor pattern;
- a core arranged so as to abut against the back surface of the board and formed with a hole for housing the electronic components at a position facing the electronic components; and a protective member configured to form a front surface of the power transmission coil unit and receive a load applied to the power transmission coil unit, wherein:

a space is formed on a back surface side of a facing portion of the protective member positioned at a location facing the component mounting part, the board is configured to have a groove shaped hole formed in a vicinity of the component mounting part so as to surround the component mounting part, the core comprises:

a top core serving as the protective member; and a bottom core arranged so as to abut against the back surface of the board and having a hole, and the top core comprises:

a peak part serving as the facing portion; and a projecting part configured to extend from the peak part to the bottom core and pass through the groove shaped hole, and the back surface of the peak part is configured not to abut against anything, and the space is formed on a back surface side of the peak part.

2. The power transmission coil unit according to claim 1, wherein the protective member is a spacer arranged so as to abut against a front surface of the board, and the spacer comprises:

a thick wall part arranged at the coil forming part and bonded to its front surface; and a thin wall part serving as the facing portion, and the thin wall part is configured not to abut against anything at its back surface due to a difference in wall thickness from the thick wall part, and the space is formed on a back surface side of the thin wall part.

3. The power transmission coil unit according to claim 1, wherein the power transmission coil unit further comprises a bottom plate arranged at the back surface of the core and bonded to the same, and the electronic components are housed in a component housing space defined by a back surface of the board, a front surface of the bottom plate, and an inner circumferential surface of the hole.

* * * * *